United States Patent
Wang et al.

(10) Patent No.: US 8,107,720 B2
(45) Date of Patent: Jan. 31, 2012

(54) DETECTION SYSTEM FOR DETECTING APPEARANCES OF MANY ELECTRONIC ELEMENTS AND METHODS OF USING THE SAME

(75) Inventors: Bily Wang, Hsinchu (TW); Kuei-Pao Chen, Hsin Chu (TW); Hsin-Cheng Chen, Jhudong Township, Hsinchu County (TW); Ming-Hao Chou, Hsinchu (TW); Ren-Chun Ni, Jhunan Township, Miaoli County (TW)

(73) Assignee: Youngtek Electronics Corporation, Hsinchu (TW)

( * ) Notice: Subject to any disclaimer, the term of this patent is extended or adjusted under 35 U.S.C. 154(b) by 443 days.

(21) Appl. No.: 12/453,636

(22) Filed: May 18, 2009

(65) Prior Publication Data

US 2010/0290664 A1    Nov. 18, 2010

(51) Int. Cl.
*G06K 9/00* (2006.01)
(52) U.S. Cl. ...... 382/145; 382/141; 382/152; 356/237.1
(58) Field of Classification Search .......... 382/141–152, 382/181, 224–227; 414/426; 356/237.1–241.6
See application file for complete search history.

(56) References Cited

U.S. PATENT DOCUMENTS

| 4,492,475 | A  | * | 1/1985  | Takahashi ...................... 356/427 |
| 5,746,323 | A  | * | 5/1998  | Dragotta ........................ 209/539 |
| 6,346,982 | B1 | * | 2/2002  | Yasuda et al. .............. 356/237.1 |
| 2007/0205084 | A1 | * | 9/2007 | Kobayashi et al. ........ 198/689.1 |
| 2009/0251815 | A1 | * | 10/2009 | Wang et al. ..................... 360/31 |

* cited by examiner

*Primary Examiner* — Tarifur Chowdhury
*Assistant Examiner* — Michael P LaPage
(74) *Attorney, Agent, or Firm* — Rosenberg, Klein & Lee (57) ABSTRACT

A detection system for detecting appearances of many electronic elements includes a rotary module, a feeding module and a detection module. The rotary module has a base structure and a hollow transparent rotary structure disposed on the base structure. The feeding module is disposed beside one side of the hollow transparent rotary structure in order to sequentially guide the electronic elements to the top surface of the hollow transparent rotary structure. The detection module has a plurality of detection units sequentially disposed around the hollow transparent rotary structure. Each detection unit is composed of an image-sensing element for sensing the electronic elements, an image-capturing element for capturing surface images of the electronic elements and a classifying element for classifying the electronic elements.

18 Claims, 9 Drawing Sheets

DETECTION SYSTEM FOR DETECTING APPEARANCES OF MANY ELECTRONIC ELEMENTS AND METHODS OF USING THE SAME

BACKGROUND OF THE INVENTION

1. Field of the Invention

The present invention relates to a detection system and a method of using the same, in particular, to a detection system for detecting appearances of many electronic elements and a method of using the same.

2. Description of Related Art

Mobile communication and electronic devices have been developed to be multi-functional, miniaturized, highly reliable and low cost. Therefore, different functions of circuit designs are integrated onto increasingly smaller chip size. For example, mobile phones with only voice communication function are out of date and newly designed phones commonly have many accessory functions, such that people can record important matters in the phone, transfer a text message to a friend or watch digital TV on the phone.

Take another example; electronic devices for cars represent highly sophisticated technologies such as navigation computer, global positioning system, and intelligence voice activation system. Accordingly with the development of automobile's electronics, the variety of electronic utilized by an automobile also increases.

Thus, with the increasing variety and sophistication of electronic devices, the quality and the reliability of the electronic components are crucial to the performance of the electronic devices. Generally, it is necessary for the components to be tested when the manufacturing procedure is finished. In the traditional inspection method, all the components are disposed on a large-area disk and many cameras are used for capturing the images of the surface appearances of the components. For inspecting the bottom surface of each component, the large-area disk has to be transparent. One method is using a quartz glass as the large-area disk but quartz glass is an expensive material. In other words, the cost of the inspection system is extremely high. Another method is using a tempered glass as the disk. However, the hardness of the tempered glass is lower than that of the electronic components so that the surface of the tempered glass is easily scratched by the components. The scratches on the tempered glass surface influence the captured bottom surface image and the analysis for the bottom surface images will not be precise. On the other hand, there are cameras disposed on both sides of the disk (i.e., top side and bottom side) and the images may be not be in focus because of influence of light (i.e. glare or reflection) that passes though the large-area disk.

Figure 1A:
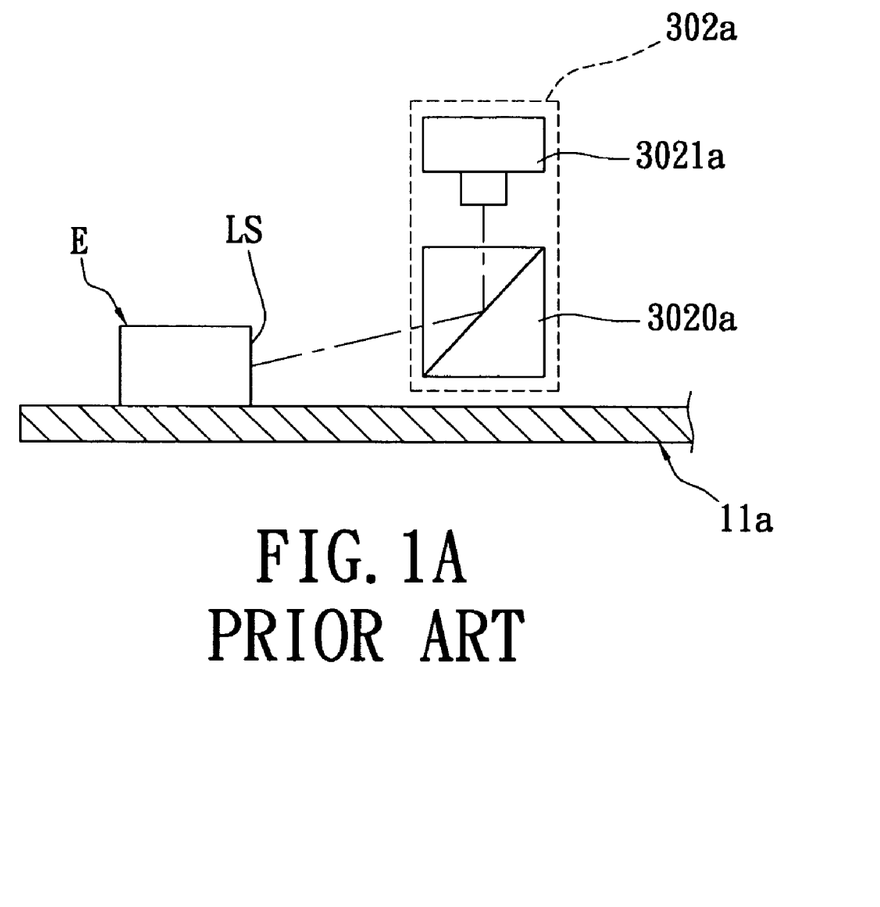
FIG. 1A is a partial, lateral, schematic view of the detection system for detecting appearances of many electronic elements according to the prior art.
Figure 1B:
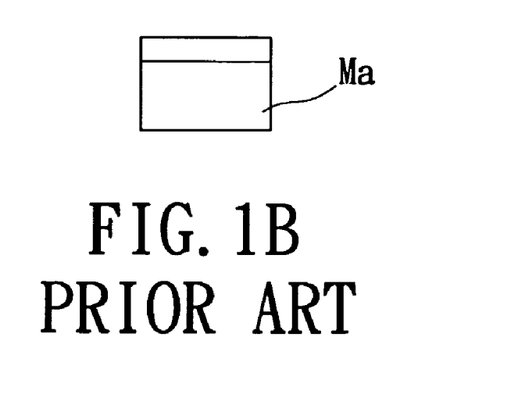
FIG. 1B is a schematic view of the image that is captured by the detection system of the prior art.

Referring to FIGS. 1A and 1B, the top surface of the transparent rotary structure 11a of the prior art is plane. Each image-capturing element 302a has a reflective mirror 3020a and an image-capturing lens 3021a disposed above the reflective mirror 3020a. However, one image-capturing element 302 applied to detect the left surface LS of each electronic element E is limited by space (is limited by the plane top surface of the transparent rotary structure 11a), so that the reflective mirror 3020a cannot aim at the left surface LS of each electronic element E. Hence, the prior art can only capture the oblique image Ma (as shown in FIG. 1B) of the left surface LS of each electronic element E by matching the reflective mirror 3020a and the image-capturing lens 3021a.

SUMMARY OF THE INVENTION

In view of the aforementioned issues, the present invention provides a detection system for detecting appearances of many electronic elements and a method of using the same. The present invention can be applied to capture correct positive images and can reduce cost.

To achieve the above-mentioned objectives, the present invention provides a detection system for detecting appearances of many electronic elements, including: a rotary module, a feeding module and a detection module. The rotary module has a base structure and a hollow transparent rotary structure disposed on the base structure. The hollow transparent rotary structure has an inner annular area and an outer annular area both formed on its bottom surface, the inner annular area is covered by the base structure, the outer annular area is exposed, and there is a receiving space formed between the base structure and the hollow transparent rotary structure. The feeding module is disposed beside one side of the hollow transparent rotary structure in order to sequentially guide the electronic elements to the top surface of the hollow transparent rotary structure. The detection module has a plurality of detection units sequentially disposed around the hollow transparent rotary structure. Each detection unit is composed of an image-sensing element for sensing the electronic elements, an image-capturing element for capturing surface images of the electronic elements and a classifying element for classifying the electronic elements.

To achieve the above-mentioned objectives, the present invention provides a method of using a detection system for detecting appearances of many electronic elements, including: sequentially guiding the electronic elements to the top surface of the hollow transparent rotary structure by a feeding module, the hollow transparent rotary structure being disposed on the base structure, the hollow transparent rotary structure having an inner annular area and an outer annular area both formed on its bottom surface, the inner annular area being covered by the base structure, the outer annular area being exposed, and a receiving space formed between the base structure and the hollow transparent rotary structure; detecting appearances of the electronic elements by a detection module that has a plurality of detection units sequentially disposed around the hollow transparent rotary structure, each detection unit being composed of an image-sensing element for sensing the electronic elements, an image-capturing element for capturing surface images of the electronic elements and a classifying element for classifying the electronic elements; and then receiving and analyzing all surface images of each electronic element by using an analysis and control module that is electrically connected to the detection module in order to judge whether the surface images of each electronic element conform to a predetermined detection standard. If the surface images of the electronic element conform to the predetermined detection standard, the electronic element is guided out by the classifying element of last one of the detection units. If one surface image of the electronic element does not conform to the predetermined detection standard, the electronic element is guided out by the classifying element of one detection unit that had detected the surface image of the electronic element.

To achieve the above-mentioned objectives, the present invention provides a detection system for detecting appearances of many electronic elements, including: a rotary module, a feeding module and a detection module. The rotary module has a base structure and a hollow transparent rotary structure disposed on the base structure. The hollow transparent rotary structure has an inner annular area and an outer annular area both formed on its bottom surface, the inner annular area is covered by the base structure, the outer annular area is exposed, and there is a receiving space formed between the base structure and the hollow transparent rotary structure. The feeding module is disposed beside one side of the hollow transparent rotary structure in order to sequentially guide the electronic elements to the top surface of the hollow transparent rotary structure. The detection module is composed of a plurality of image-sensing elements for sensing the electronic elements, a plurality of image-capturing elements for capturing surface images of the electronic elements and a plurality of classifying elements for classifying the electronic elements. The image-sensing elements, the image-capturing elements and the classifying elements are selectably and alternately disposed around the hollow transparent rotary structure.

Therefore, the receiving space is formed between the base structure and the hollow transparent rotary structure, so that the detection module can capture a correct positive image by using the receiving space as a concave space. In addition, the present invention can reduce cost due to the hollow design of the hollow transparent rotary structure.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

FIG. 3F1 is a partial, top, schematic view of the detection system for detecting the left surface of each electronic element according to the present invention;

FIG. 3F2 is a partial, lateral, schematic view of the detection system for detecting the left surface of each electronic element according to the present invention;

FIG. 3F3 is a schematic view of the image that is captured by the detection system of the present invention;

FIG. 5A1 is a front, schematic view of a first arrangement of the electronic elements according to the present invention;

FIG. 5A2 is a schematic view of waveforms for showing the first arrangement of the electronic elements according to the present invention;

FIG. 5B1 is a front, schematic view of a second arrangement of the electronic elements according to the present invention;

FIG. 5B2 is a schematic view of waveforms for showing the second arrangement of the electronic elements according to the present invention;

FIG. 5C1 is a front, schematic view of a third arrangement of the electronic elements according to the present invention;

FIG. 5C2 is a schematic view of waveforms for showing the third arrangement of the electronic elements according to the present invention.

DETAILED DESCRIPTION OF THE PREFERRED EMBODIMENTS

Figure 2A:
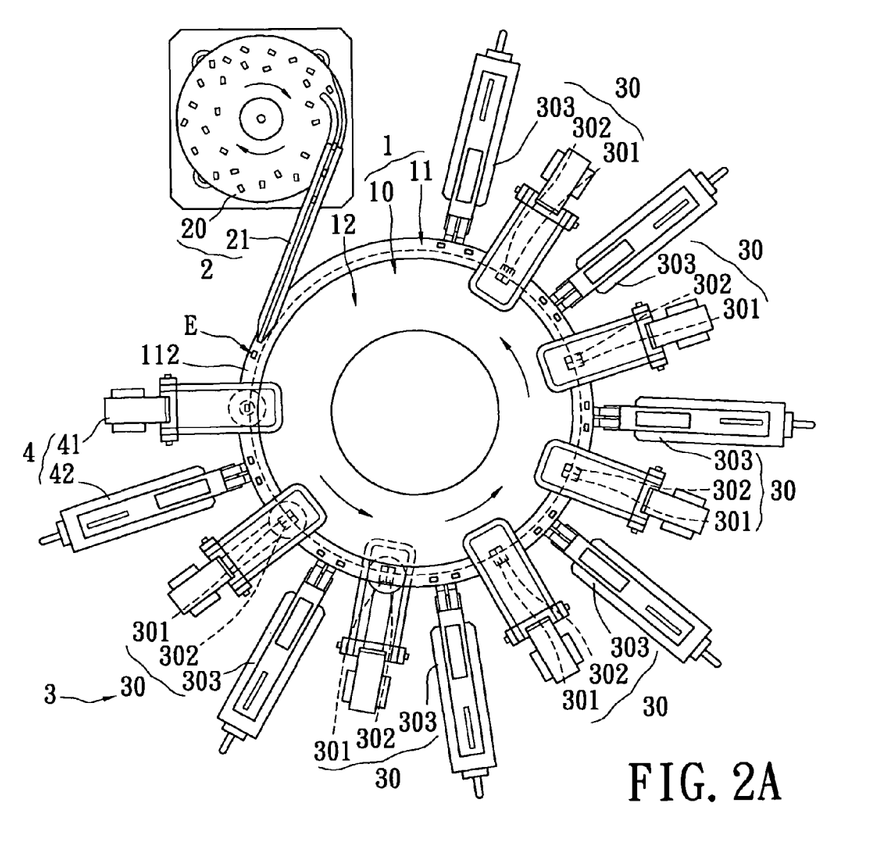
FIG. 2A is a top, schematic view of the detection system for detecting appearances of many electronic elements according to the present invention.
Figure 2B:
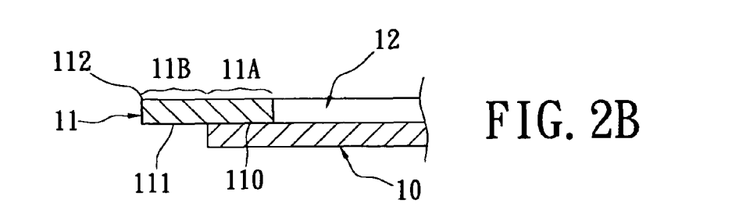
FIG. 2B is a partial, cross-sectional, schematic view of the rotary module of the present invention.

Referring to FIGS. 2A and 2B, the present invention provides a detection system for detecting appearances of many electronic elements, including: a rotary module 1, a feeding module 2 and a detection module 3.

The rotary module 1 has a base structure 10 and a hollow transparent rotary structure 11 disposed on the base structure 10. The base structure 10 can be made of metal, and the hollow transparent rotary structure 11 can be made of quartz glass. In addition, the hollow transparent rotary structure 11 has an inner annular area 110 and an outer annular area 111 both formed on its bottom surface, the inner annular area 110 is covered by the base structure 10, the outer annular area 111 is exposed, and there is a receiving space 12 formed between the base structure 10 and the hollow transparent rotary structure 11. The hollow transparent rotary structure 11 has an inner annular portion 11A disposed on the base structure 10 and an outer annular portion 11B being suspended in midair, and the hollow transparent rotary structure 11 has an annular area 112 formed on its top surface and corresponding to the outer annular area 111.

Moreover, the feeding module 2 is disposed beside one side of the hollow transparent rotary structure 11 in order to sequentially guide the electronic elements E to the annular area 112 of the top surface of the hollow transparent rotary structure 11. The feeding module 2 has a feeding rotary 20 for receiving the electronic elements E and a feeding track 21 for guiding the electronic elements E from the feeding rotary 20 to the top surface of the hollow transparent rotary structure 11.

Furthermore, the detection module 3 has a plurality of detection units 30 sequentially disposed around the hollow transparent rotary structure 11. Each detection unit 30 is composed of an image-sensing element 301 for sensing the electronic elements E, an image-capturing element 302 for capturing surface images of the electronic elements E and a classifying element 303 for classifying the electronic elements E. In the this embodiment, the detection module 3 has six detection units 30 for respectively detecting a top surface, a bottom surface, a front surface, a rear surface, a left surface and a right six surface of each electronic element E.

In addition, the detection system further includes an elimination device 4 disposed beside the hollow transparent rotary structure 11 and the feeding module 2 for eliminating error arrangement of the electronic elements E. The elimination device 4 has an image pre-sensing element 41 and a pre-classifying element 42 beside one side of the image pre-sensing element 41. In other words, the present invention can use the image pre-sensing element 41 to sense and calculate the length of each electronic element E. If the length that has been calculated out is over the original length of each electronic element E, it means that more than two electronic elements E are close to each other. Hence, the combination of more than two electronic elements E is guided out from the hollow transparent rotary structure 11 by the pre-classifying element 11.

Figure 2C:
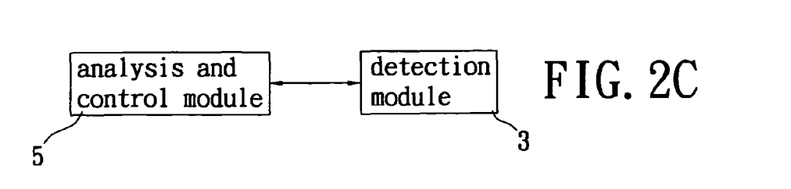
FIG. 2C is a function block of the analysis and control module electrically connected with the detection module according to the present invention.

Referring to FIG. 2C, the detection system further includes an analysis and control module 5 (such as a computer) electrically connected to the detection module 3 in order to receive and analyze surface images of each electronic element E.

Figure 3A:
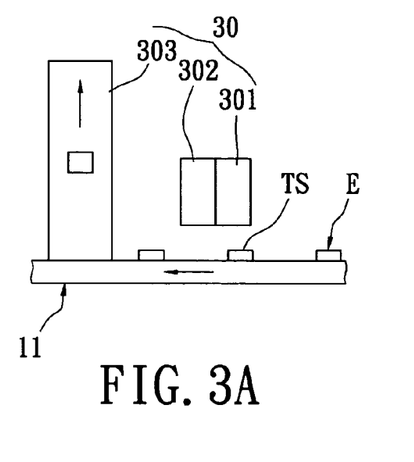
FIG. 3A is a partial, front, schematic view of the detection system for detecting the top surface of each electronic element according to the present invention.

Referring to FIG. 3A, the top surface TS of each electronic element E passes through the image-sensing element 301 and the image-capturing element 302, so that the image of the top surface TS of each electronic element E is captured by matching the image-sensing element 301 and the image-capturing element 302. If the image of the top surface TS of one electronic element E conforms to a predetermined detection standard, the electronic element E is guided to next detection unit 30 to detect another surface of the electronic element E. If the image of the top surface TS of one electronic element E does not conform to a predetermined detection standard, the electronic element E is guided out (shown as the direction of the arrow) from the hollow transparent rotary structure 11 by the classifying element 303. In other words, when the image of any one surface of the electronic element E does not conform to a predetermined detection standard, other surface of the electronic element E does not need to be detected. Hence, the error electronic element E needs to be guided out by the classifying element 303.

Figure 3B:
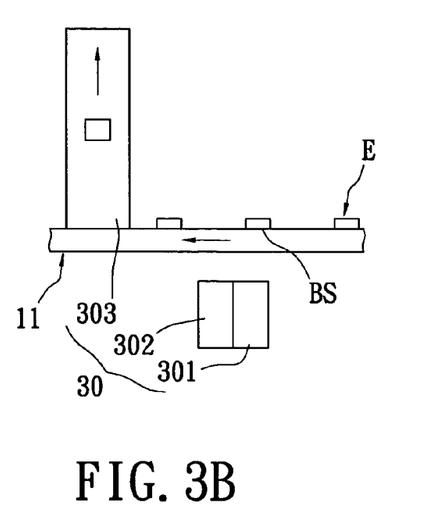
FIG. 3B is a partial, front, schematic view of the detection system for detecting the bottom surface of each electronic element according to the present invention.

Referring to FIG. 3B, the bottom surface BS of each electronic element E passes through the image-sensing element 301 and the image-capturing element 302, so that the image of the bottom surface BS of each electronic element E is captured by matching the image-sensing element 301 and the image-capturing element 302. If the image of the bottom surface BS of one electronic element E conforms to a predetermined detection standard, the electronic element E is guided to next detection unit 30 to detect another surface of the electronic element E. If the image of the bottom surface BS of one electronic element E does not conform to a predetermined detection standard, the electronic element E is guided out (shown as the direction of the arrow) from the hollow transparent rotary structure 11 by the classifying element 303. In other words, when the image of any one surface of the electronic element E does not conform to a predetermined detection standard, other surface of the electronic element E does not need to be detected. Hence, the error electronic element E needs to be guided out by the classifying element 303.

Figure 3C:
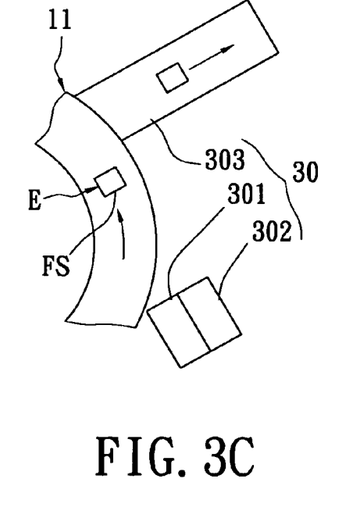
FIG. 3C is a partial, top, schematic view of the detection system for detecting the front surface of each electronic element according to the present invention.

Referring to FIG. 3C, the front surface FS of each electronic element E passes through the image-sensing element 301 and the image-capturing element 302, so that the image of the front surface FS of each electronic element E is captured by matching the image-sensing element 301 and the image-capturing element 302. If the image of the front surface FS of one electronic element E conforms to a predetermined detection standard, the electronic element E is guided to next detection unit 30 to detect another surface of the electronic element E. If the image of the front surface FS of one electronic element E does not conform to a predetermined detection standard, the electronic element E is guided out (shown as the direction of the arrow) from the hollow transparent rotary structure 11 by the classifying element 303. In other words, when the image of any one surface of the electronic element E does not conform to a predetermined detection standard, other surface of the electronic element E does not need to be detected. Hence, the error electronic element E needs to be guided out by the classifying element 303.

Figure 3D:
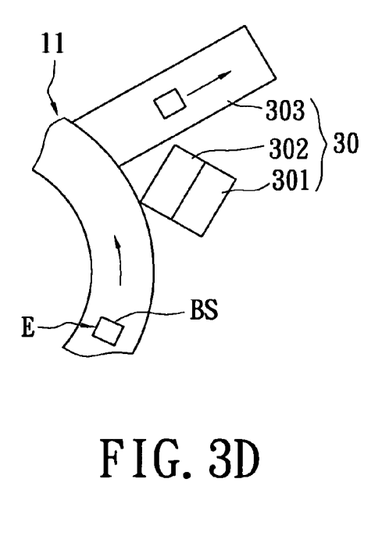
FIG. 3D is a partial, top, schematic view of the detection system for detecting the back surface of each electronic element according to the present invention.

Referring to FIG. 3D, the back surface BS of each electronic element E passes through the image-sensing element 301 and the image-capturing element 302, so that the image of the back surface BS of each electronic element E is captured by matching the image-sensing element 301 and the image-capturing element 302. If the image of the back surface BS of one electronic element E conforms to a predetermined detection standard, the electronic element E is guided to next detection unit 30 to detect another surface of the electronic element E. If the image of the back surface BS of one electronic element E does not conform to a predetermined detection standard, the electronic element E is guided out (shown as the direction of the arrow) from the hollow transparent rotary structure 11 by the classifying element 303. In other words, when the image of any one surface of the electronic element E does not conform to a predetermined detection standard, other surface of the electronic element E does not need to be detected. Hence, the error electronic element E needs to be guided out by the classifying element 303.

Figure 3E:
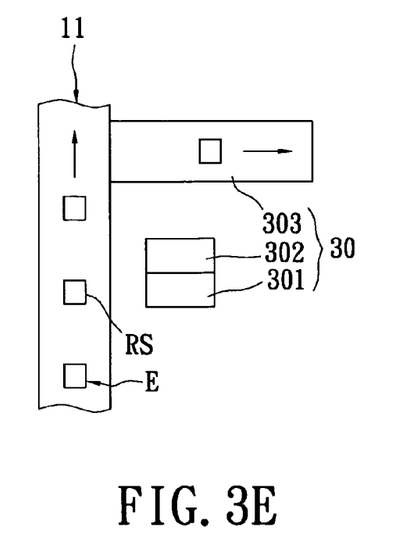
FIG. 3E is a partial, top, schematic view of the detection system for detecting the right surface of each electronic element according to the present invention.

Referring to FIG. 3E, the right surface RS of each electronic element E passes through the image-sensing element 301 and the image-capturing element 302, so that the image of the right surface RS of each electronic element E is captured by matching the image-sensing element 301 and the image-capturing element 302. If the image of the right surface RS of one electronic element E conforms to a predetermined detection standard, the electronic element E is guided to next detection unit 30 to detect another surface of the electronic element E. If the image of the right surface RS of one electronic element E does not conform to a predetermined detection standard, the electronic element E is guided out (shown as the direction of the arrow) from the hollow transparent rotary structure 11 by the classifying element 303. In other words, when the image of any one surface of the electronic element E does not conform to a predetermined detection standard, other surface of the electronic element E does not need to be detected. Hence, the error electronic element E needs to be guided out by the classifying element 303.

Figure 3F:
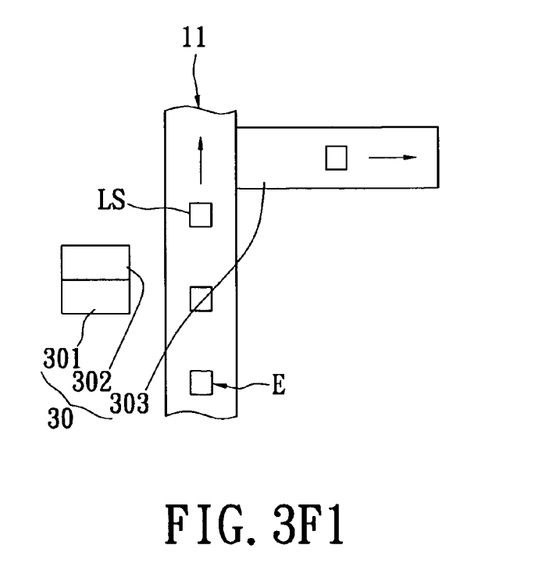
Figure 3F:
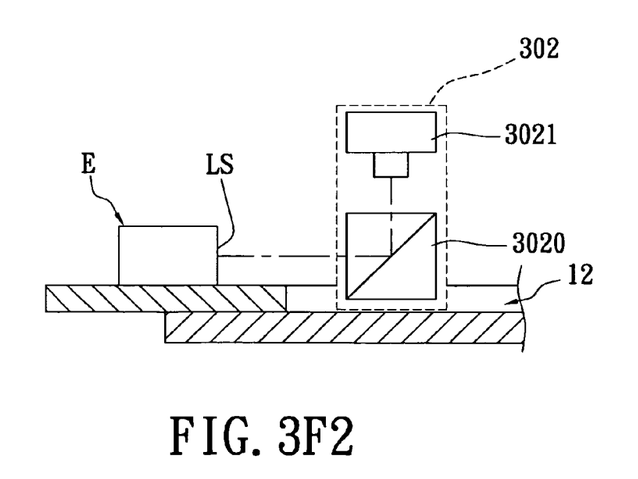
Figure 3F:
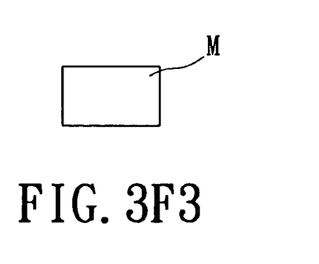

Referring to FIG. 3F1, the left surface LS of each electronic element E passes through the image-sensing element 301 and the image-capturing element 302, so that the image of the left surface LS of each electronic element E is captured by matching the image-sensing element 301 and the image-capturing element 302. If the image of the left surface LS of one electronic element E conforms to a predetermined detection standard, the electronic element E is guided out (shown as the direction of the arrow) from the hollow transparent rotary structure 11 to the GO tray of the classifying element 303. If the image of the left surface LS of one electronic element E does not conform to a predetermined detection standard, the electronic element E is guided out (shown as the direction of the arrow) from the hollow transparent rotary structure 11 to the NO-GO tray of the classifying element 303. In other words, when the images of all surfaces of the electronic element E conform to the predetermined detection standard, the electronic element E passes the detection standard. Hence, when the electronic element E passes the detection standard, the electronic element E is guided to the GO tray by the classifying element 303; when the electronic element E does not pass the detection standard, the electronic element E is guided to the NO-GO tray by the classifying element 303.

Referring to FIGS. 3F2 and 3F3, each image-capturing element 302 has a reflective mirror 3020 and an image-capturing lens 3021 disposed above the reflective mirror 3020, and the image-capturing element 302 of the detection unit 30 for detecting the left surface LS of each electronic element E is disposed above the receiving space 12. Therefore, the reflective mirror 3020 can be disposed on a lower position that is near the receiving space 12, so that the positive image M as shown in FIG. 3F3 of the left surface LS of each electronic element E can be captured by matching the reflective mirror 3020 and the image-capturing lens 3021.

Figure 4:
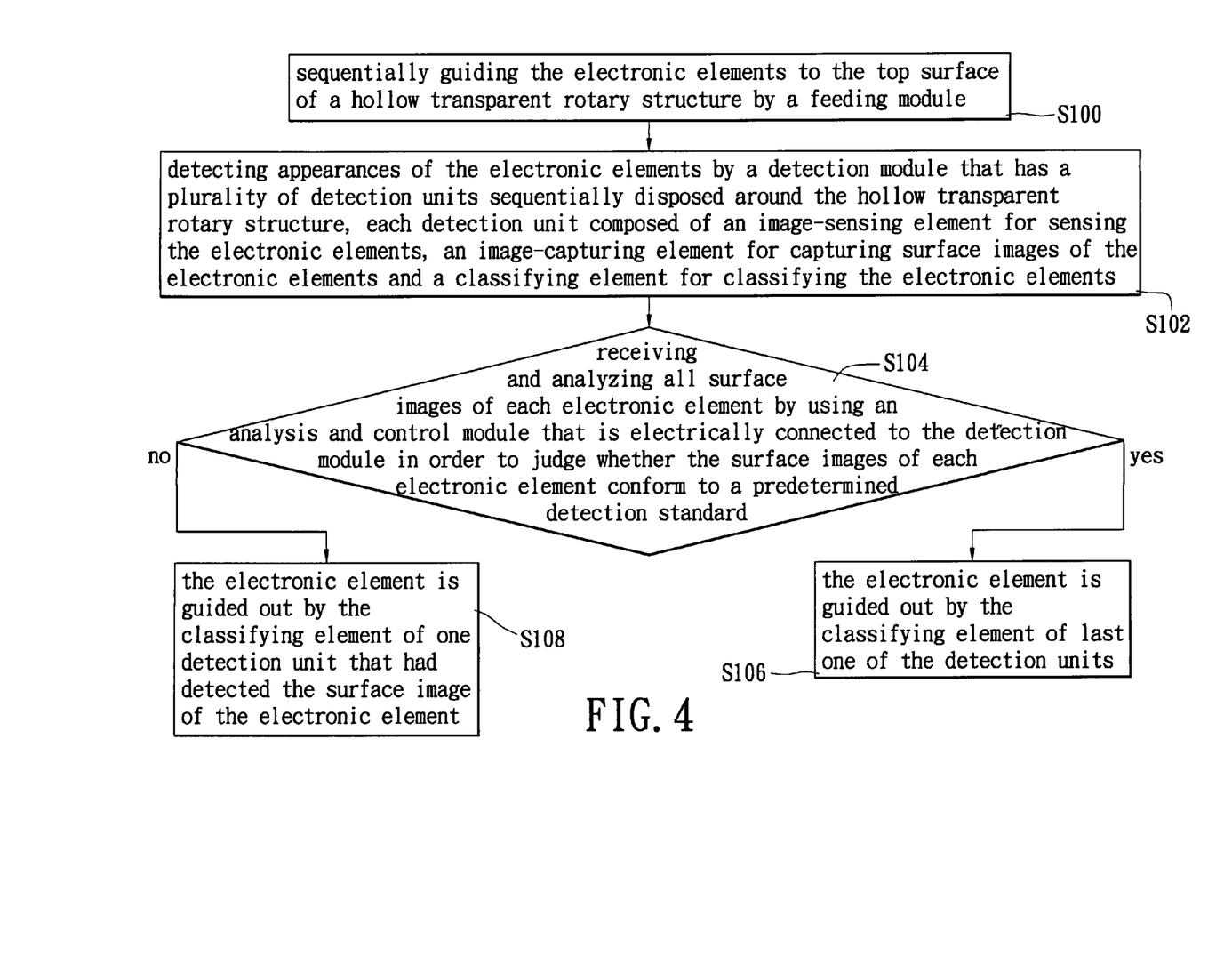
FIG. 4 is a flowchart of a method of using a detection system for detecting appearances of many electronic elements according to the present invention.

Referring to FIG. 4, the present invention provides a method of using a detection system for detecting appearances of many electronic elements. The method includes the following steps:

Step S100 is that: referring to FIGS. 2A and 4, sequentially guiding the electronic elements E to the top surface of the hollow transparent rotary structure 11 by a feeding module 2, the hollow transparent rotary structure 11 disposed on the base structure 10, the hollow transparent rotary structure 11 having an inner annular area 110 and an outer annular area 111 both formed on its bottom surface, the inner annular area 110 covered by the base structure 10, the outer annular area 111 being exposed, and a receiving space 12 formed between the base structure 10 and the hollow transparent rotary structure 11.

Step S102 is that: referring to FIGS. 2A and 4, detecting appearances of the electronic elements E by a detection module 3 that has a plurality of detection units 30 sequentially disposed around the hollow transparent rotary structure 11, each detection unit 30 composed of an image-sensing element 301 for sensing the electronic elements E, an image-capturing element 302 for capturing surface images of the electronic elements E and a classifying element 303 for classifying the electronic elements E.

Step S104 is that: referring to FIGS. 2A and 4, receiving and analyzing all surface images of each electronic element E by using an analysis and control module 5 that is electrically connected to the detection module 3 in order to judge whether the surface images of each electronic element E conform to a predetermined detection standard.

Step S106 is that: if all of the surface images of the electronic element E conform to the predetermined detection standard, the electronic element E is guided out by the classifying element 303 of last one of the detection units 30.

Step S108 is that: if one surface image of the electronic element E does not conform to the predetermined detection standard, the electronic element E is guided out by the classifying element 303 of one detection unit 30 that had detected the surface image of the electronic element E.

Figure 5:
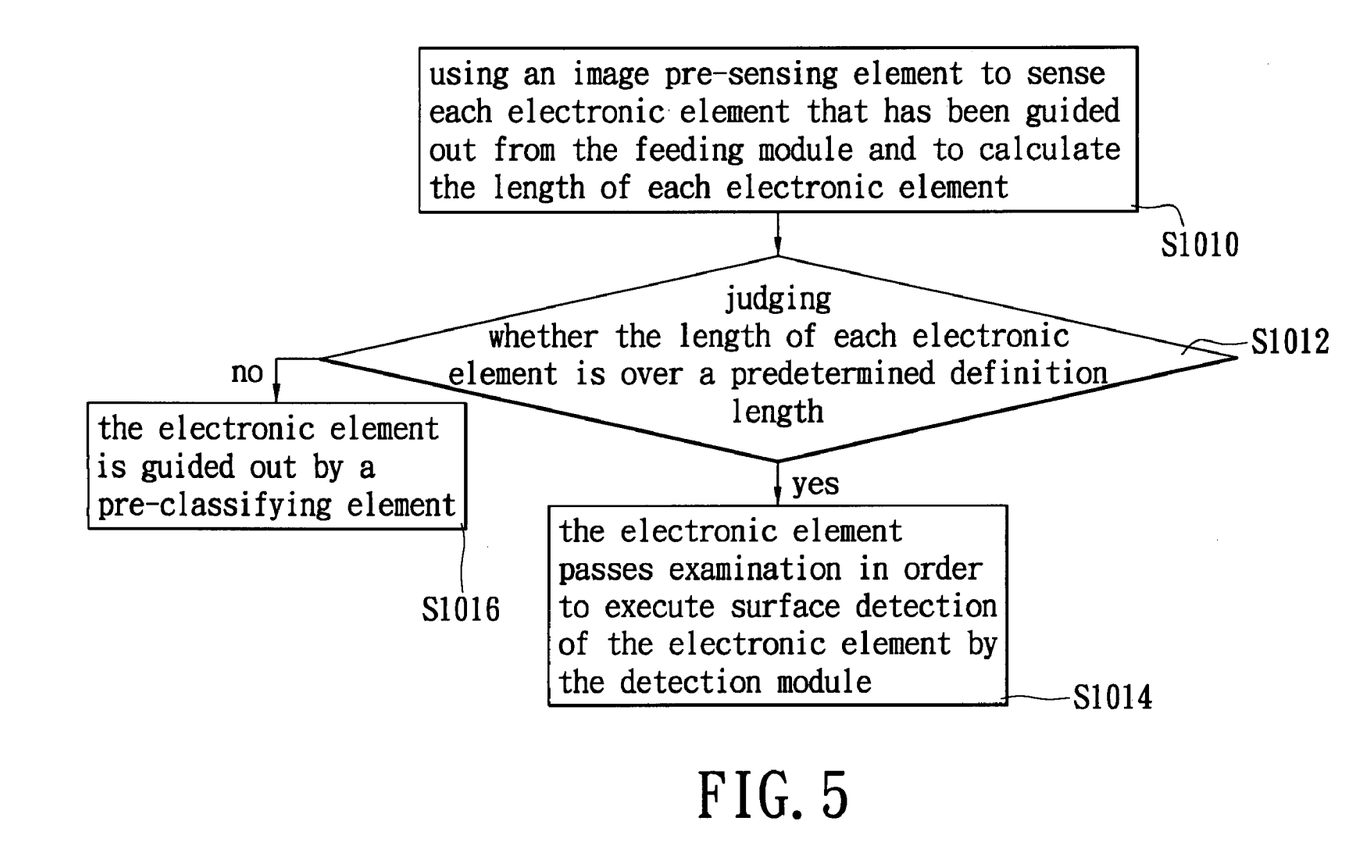
FIG. 5 is a further flowchart between the step S100 and the step S102 of FIG. 4.
Figure 5A:
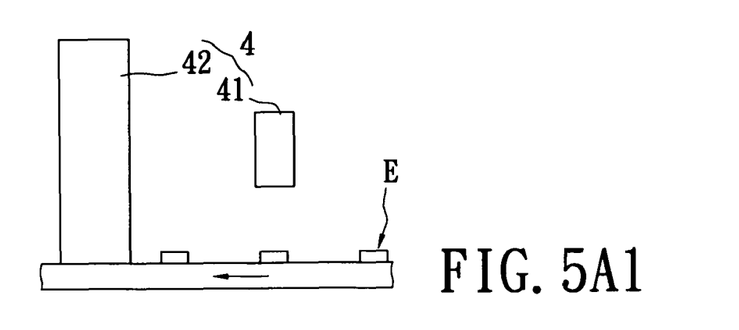
Figure 5A:
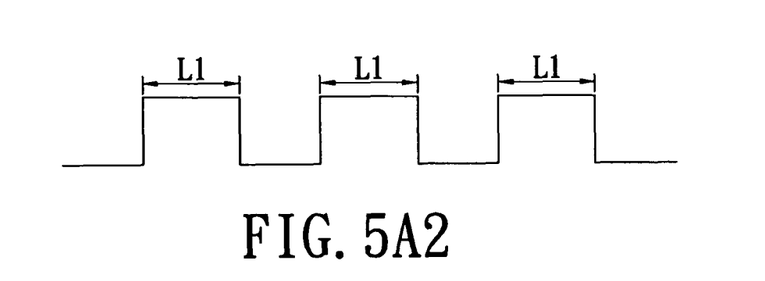

Referring to FIG. 5, before the step of detecting appearances of the electronic elements by the detection module, the method further includes the following steps between the step S100 and the step S102:

Step S1010 is that: referring to FIGS. 5, 5A1, 5A2, 5B1 and 5B2, using an image pre-sensing element 41 to sense each electronic element E that has been guided out from the feeding module 2 and to calculate the length of each electronic element E. In addition, the arrangement of the electronic elements E is normal as shown in FIG. 5A1, so that the length L1 of each waveform is the same as shown in FIG. 5A2. The arrangement of one set of the electronic elements E is abnormal as shown in FIG. 5B1 (two of the electronic elements E are combined to each other), so that the length L2 of each one of most waveforms is the same and the length L2' of one waveform is larger that the length L2 of other wave form as shown in FIG. 5B2.

Step S1012 is that: referring to FIGS. 5, 5A2 and 5B2, judging whether the length of each electronic element E is over a predetermined definition length. For example, the length L1 of each waveform is the same as shown in FIG. 5A2, so that the arrangement of the electronic elements E is normal as shown in FIG. 5A1. The length L2' of one waveform is larger that the length L2 of other wave form as shown in FIG. 5B2, so that the arrangement of one set of the electronic elements E is abnormal as shown in FIG. 5B1

Step S1014 is that: if the length of the electronic element E is not over the predetermined definition length, the electronic element E passes examination in order to execute surface detection of the electronic element E by the detection module 3.

Figure 5B:
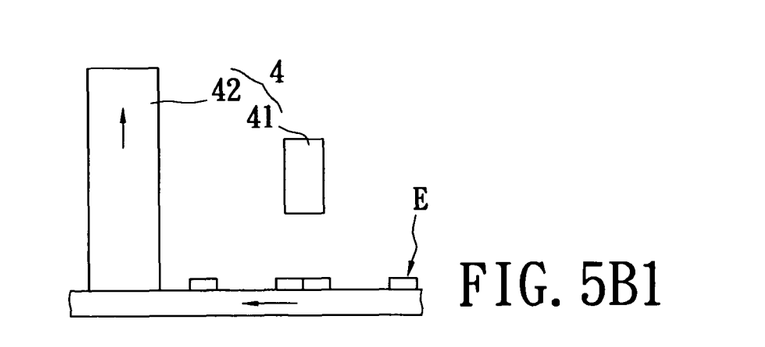
Figure 5B:
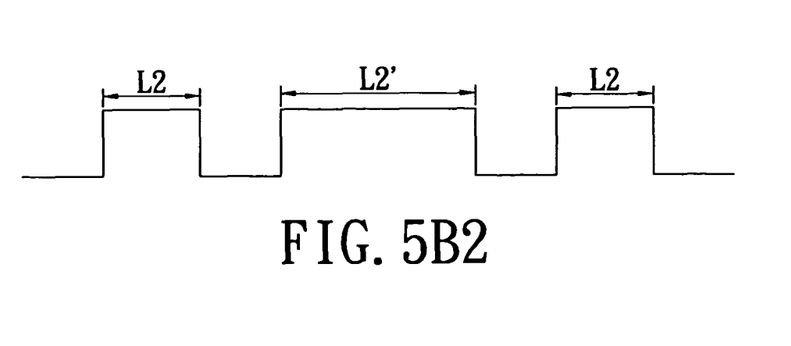

Step S1016 is that: if the length of the electronic element E is over the predetermined definition length, the electronic element E is guided out (shown as the direction of the arrow in FIG. 5B1) by a pre-classifying element 42.

Figure 5C:
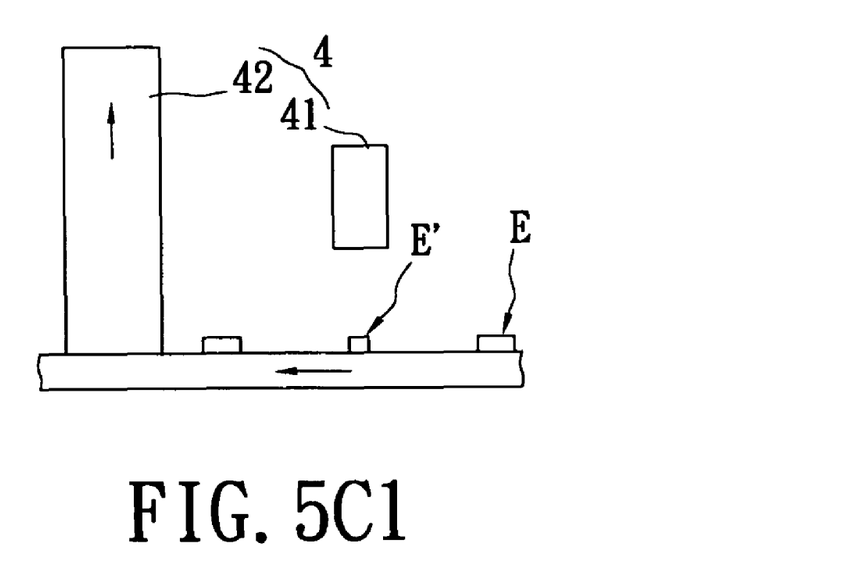
Figure 5C:
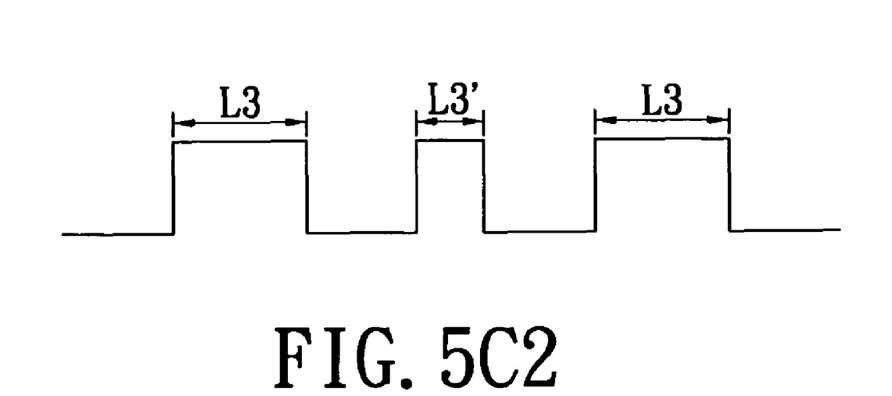

Referring to FIGS. 5C1 and 5C2, the electronic element E' is abnormal as shown in FIG. 5C1 (one part of the electronic element E' is cut), so that the length L3 of each one of most waveforms is the same and the length L3' of one waveform is smaller that the length L3 of other wave form as shown in FIG. 5C2.

In addition, the length L3' of one waveform is smaller that the length L3 of other wave form as shown in FIG. 5C2, so that the length of the electronic elements E' is too short as shown in FIG. 5C1. Hence, when the length of the electronic element E' detected by the image pre-sensing element 41 is smaller than a predetermined definition length, the electronic element E' should be guided out (shown as the direction of the arrow in FIG. 5C1) from the pre-classifying element 42. In other words, when the length of any one of the electronic elements detected by the image pre-sensing element 41 is smaller or larger than a predetermined definition length, the electronic element should be guided out from the pre-classifying element 42.

Figure 6:
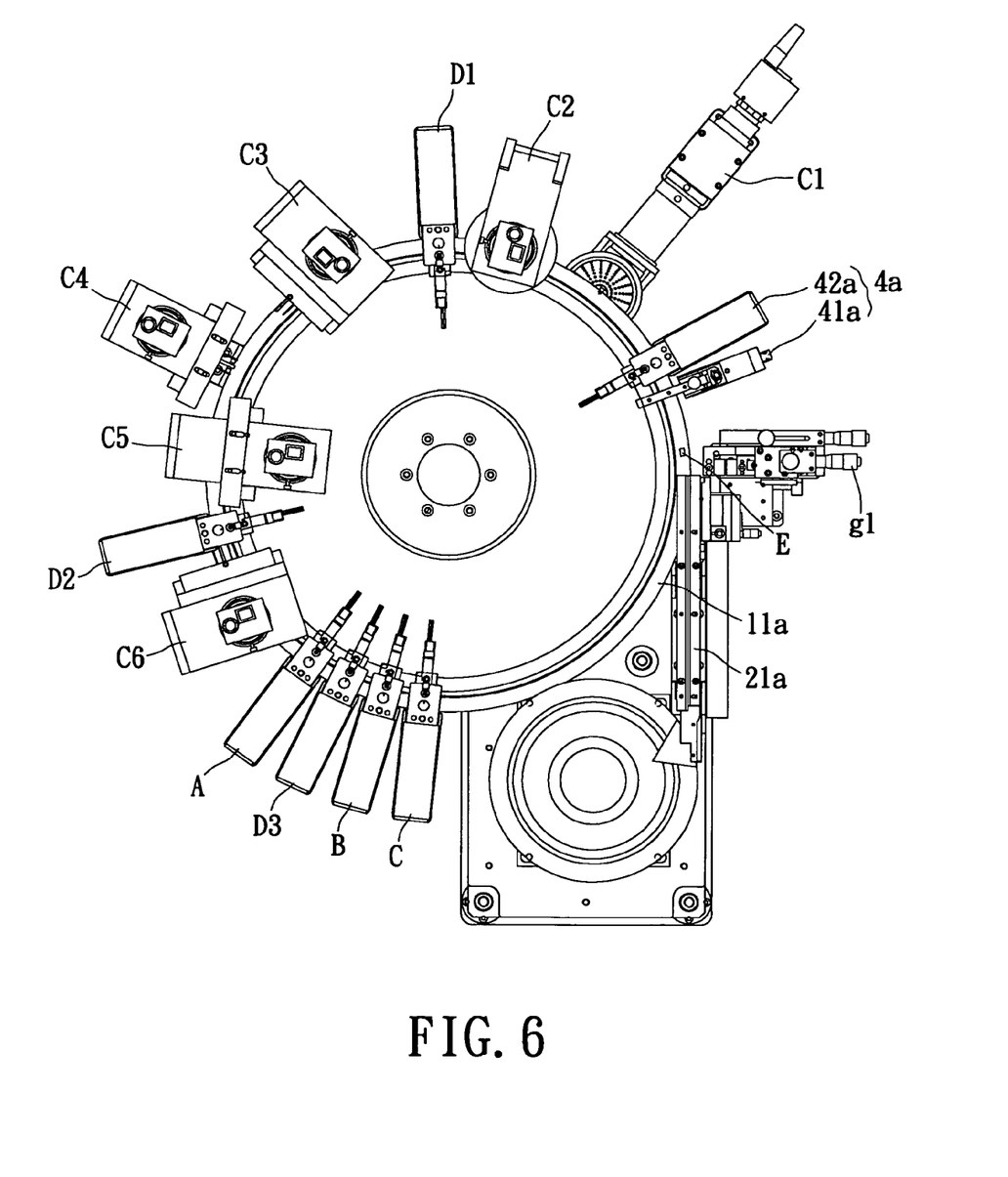
FIG. 6 is a top, schematic view of another detection system for detecting appearances of many electronic elements according to the present invention.

However, the arrangement of the detection module 3 and the numbers of the image-sensing element 301, the image-capturing element 302 and the classifying element 303 do not limit the present invention. Referring to FIG. 6, another embodiment of the present invention provides a detection system for detecting appearances of many electronic elements. There is a guiding element g1 disposed beside the feeding track 21a in order to guide the electronic elements E on a correction position of the hollow transparent rotary structure 11. The present invention includes the some elements disposed around the hollow transparent rotary structure 11, as follows:

(1) An elimination device 4a has an image pre-sensing element 41a and a pre-classifying element 42a. The function of the elimination device 4a is the same as the function of the elimination device 4.

(2) A first image-capturing element C1 is applied to capture the surface image of the bottom surface of the electronic elements E.

(3) A second image-capturing element C2 is applied to capture the surface image of the top surface of the electronic elements E.

(4) A first classifying element D1 is applied to eliminate defective electronic element E that had passed through the first image-capturing element C1 and the second image-capturing element C2.

(5) A third image-capturing element C3 is applied to capture the surface image of the left surface of the electronic elements E.

(6) A fourth image-capturing element C4 is applied to capture the surface image of the front surface of the electronic elements E.

(7) A fifth image-capturing element C5 is applied to capture the surface image of the back surface of the electronic elements E.

(8) A second classifying element D2 is applied to eliminate defective electronic element E that had passed through the fourth image-capturing element C4 and the fifth image-capturing element C5.

(9) A sixth image-capturing element C6 is applied to capture the surface image of the right surface of the electronic elements E.

(10) A standby classifying element A.

(11) A third classifying element D3 is applied to eliminate defective electronic element E that had passed through the three image-capturing elements C3 and the sixth image-capturing element C6.

(12) A final okay classifying element B is applied to guide out the passed electronic elements E.

(13) A remainder-eliminating element C is applied to eliminate remaining electronic elements on the hollow transparent rotary structure 11.

Therefore, a detection module can be composed of a plurality of image-sensing elements for sensing the electronic elements, a plurality of image-capturing elements for capturing surface images of the electronic elements and a plurality of classifying elements for classifying the electronic elements. The image-sensing elements, the image-capturing elements and the classifying elements are selectably and alternately disposed around the hollow transparent rotary structure 11.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A detection system for detecting appearances of many electronic elements, comprising:
    a rotary module having a base structure and a hollow transparent rotary structure disposed on the base structure, wherein the hollow transparent rotary structure has an inner annular area and an outer annular area both formed on its bottom surface, the inner annular area is covered by the base structure, the outer annular area is exposed, and there is a receiving space formed between the base structure and the hollow transparent rotary structure;
    a feeding module disposed beside one side of the hollow transparent rotary structure in order to sequentially guide the electronic elements to the top surface of the hollow transparent rotary structure; and
    a detection module having a plurality of detection units sequentially disposed around the hollow transparent rotary structure, wherein each detection unit is composed of an image-sensing element for sensing the electronic elements, an image-capturing element for capturing surface images of the electronic elements and a classifying element for classifying the electronic elements.

2. The detection system according to claim 1, wherein the base structure is metal, and the hollow transparent rotary structure is quartz glass.

3. The detection system according to claim 1, wherein the hollow transparent rotary structure has an inner annular portion disposed on the base structure and an outer annular portion being suspended in midair, and the hollow transparent rotary structure has an annular area formed on its top surface and corresponding to the outer annular area.

4. The detection system according to claim 1, wherein the feeding module has a feeding rotary for receiving the electronic elements and a feeding track for guiding the electronic elements from the feeding rotary to the top surface of the hollow transparent rotary structure.

5. The detection system according to claim 1, wherein the detection module has six detection units for respectively detecting a top surface, a bottom surface, a front surface, a rear surface, a left surface and a right six surface of each electronic element.

6. The detection system according to claim 5, wherein the image-capturing element of the detection unit for detecting the left surface of each electronic element is disposed above the receiving space.

7. The detection system according to claim 1, wherein each image-capturing element has a reflective mirror and an image-capturing lens disposed above the reflective mirror.

8. The detection system according to claim 1, further comprising: an elimination device disposed beside the hollow transparent rotary structure and the feeding module for eliminating error arrangement of the electronic elements, wherein the elimination device has an image pre-sensing element and a pre-classifying element beside one side of the image pre-sensing element.

9. The detection system according to claim 1, further comprising: an analysis and control module electrically connected to the detection module in order to receive and analyze surface images of each electronic element.

10. A method of using a detection system for detecting appearances of many electronic elements, comprising:
    sequentially guiding the electronic elements to the top surface of the hollow transparent rotary structure by a feeding module, wherein the hollow transparent rotary structure is disposed on the base structure, the hollow transparent rotary structure has an inner annular area and an outer annular area both formed on its bottom surface, the inner annular area is covered by the base structure, the outer annular area is exposed, and there is a receiving space formed between the base structure and the hollow transparent rotary structure;
    detecting appearances of the electronic elements by a detection module that has a plurality of detection units sequentially disposed around the hollow transparent rotary structure, wherein each detection unit is composed of an image-sensing element for sensing the electronic elements, an image-capturing element for capturing surface images of the electronic elements and a classifying element for classifying the electronic elements; and
    receiving and analyzing all surface images of each electronic element by using an analysis and control module that is electrically connected to the detection module in order to judge whether the surface images of each electronic element conform to a predetermined detection standard;

wherein if the surface images of the electronic element conform to the predetermined detection standard, the electronic element is guided out by the classifying element of last one of the detection units;

wherein if one surface image of the electronic element does not conform to the predetermined detection standard, the electronic element is guided out by the classifying element of one detection unit that had detected the surface image of the electronic element.

11. The method according to claim 10, wherein the base structure is metal, and the hollow transparent rotary structure is quartz glass.

12. The method according to claim 10, wherein the hollow transparent rotary structure has an inner annular portion disposed on the base structure and an outer annular portion being suspended in midair, and the hollow transparent rotary structure has an annular area formed on its top surface and corresponding to the outer annular area.

13. The method according to claim 10, wherein the feeding module has a feeding rotary for receiving the electronic elements and a feeding track for guiding the electronic elements from the feeding rotary to the top surface of the hollow transparent rotary structure.

14. The method according to claim 10, wherein the detection module has six detection units for respectively detecting a top surface, a bottom surface, a front surface, a rear surface, a left surface and a right six surface of each electronic element.

15. The method according to claim 14, wherein the image-capturing element of the detection unit for detecting the left surface of each electronic element is disposed above the receiving space.

16. The method according to claim 10, wherein each image-capturing element has a reflective mirror and an image-capturing lens disposed above the reflective mirror.

17. The method according to claim 10, wherein before the step of detecting appearances of the electronic elements by the detection module, the method further comprising:

using an image pre-sensing element to sense each electronic element that has been guided out from the feeding module and to calculate the length of each electronic element; and judging whether the length of each electronic element is over a predetermined definition length;

wherein if the length of the electronic element is not over the predetermined definition length, the electronic element passes examination;

wherein if the length of the electronic element is over the predetermined definition length, the electronic element is guided out by a pre-classifying element that is disposed beside one side of the image pre-sensing element.

18. A detection system for detecting appearances of many electronic elements, comprising:

a rotary module having a base structure and a hollow transparent rotary structure disposed on the base structure, wherein the hollow transparent rotary structure has an inner annular area and an outer annular area both formed on its bottom surface, the inner annular area is covered by the base structure, the outer annular area is exposed, and there is a receiving space formed between the base structure and the hollow transparent rotary structure;

a feeding module disposed beside one side of the hollow transparent rotary structure in order to sequentially guide the electronic elements to the top surface of the hollow transparent rotary structure;

a detection module composed of a plurality of image-sensing elements for sensing the electronic elements, a plurality of image-capturing elements for capturing surface images of the electronic elements and a plurality of classifying elements for classifying the electronic elements, wherein the image-sensing elements, the image-capturing elements and the classifying elements are selectably and alternately disposed around the hollow transparent rotary structure.

* * * * *